United States Patent [19]

Lau

[11] Patent Number: 4,967,697
[45] Date of Patent: Nov. 6, 1990

[54] FLOATING FISH FEEDING DEVICE

[76] Inventor: Glenn H. Lau, 2465 NW. 100 Ave., Ocala, Fla. 32675

[21] Appl. No.: 375,505

[22] Filed: Jul. 5, 1989

[51] Int. Cl.$^5$ .................................................. A01K 1/10
[52] U.S. Cl. .................................................. 119/51.04
[58] Field of Search .................. 119/51.04, 52.1, 56.1, 119/51.11, 51.12, 51.01

[56] References Cited

U.S. PATENT DOCUMENTS

| 3,939,802 | 2/1976 | Neff | 119/51.04 |
| 4,372,252 | 2/1983 | Lowry, Jr. | 119/51.04 |

FOREIGN PATENT DOCUMENTS

| 0076539 | 4/1983 | European Pat. Off. | |
| 604546 | 4/1978 | U.S.S.R. | 119/51.04 |
| 1316139 | 5/1973 | United Kingdom | 119/51.04 |
| 1505294 | 3/1978 | United Kingdom | 119/51.04 |

Primary Examiner—John J. Wilson
Assistant Examiner—R. Thomas Price
Attorney, Agent, or Firm—John M. Harrison

[57] ABSTRACT

A self-contained, automatic, floating fish feeding device which is characterized by multiple legs provided with floats at one end, the legs converging upwardly at the opposite end to a frame plate which supports a hanger for suspending a barrel containing fish food. The barrel is equipped with a battery-operated electric motor coupled to a feed-propelling device which periodically dispenses pelletized feed flowing by gravity from the barrel, by operation of a timing mechanism. A solar dome may be provided on the plate for generating electricity and charging a battery which operates the motor.

11 Claims, 2 Drawing Sheets

U.S. Patent  Nov. 6, 1990  Sheet 1 of 2  4,967,697
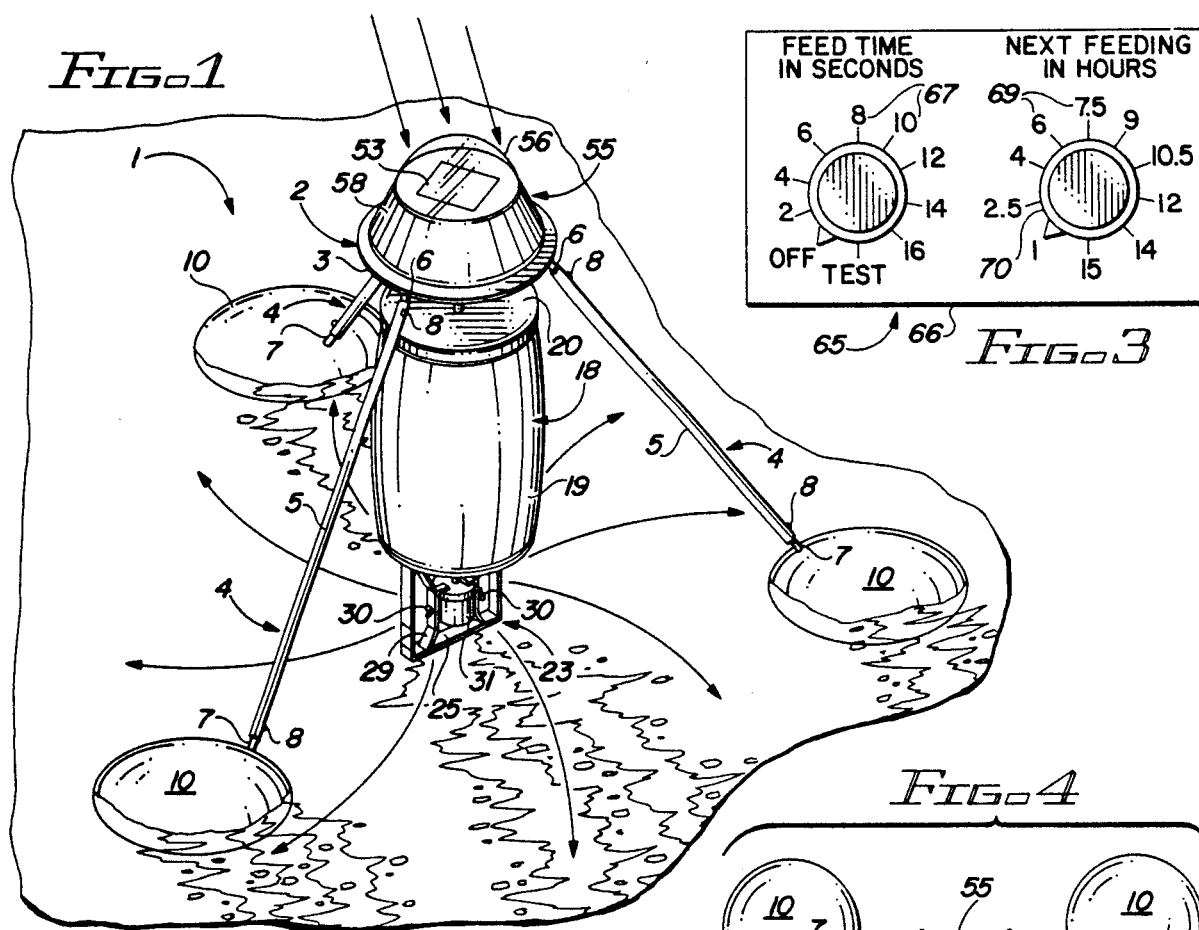
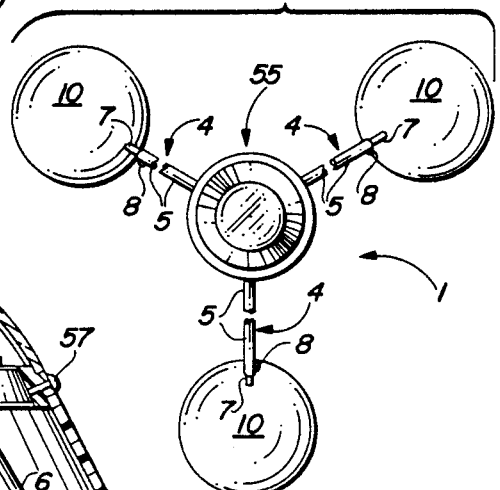
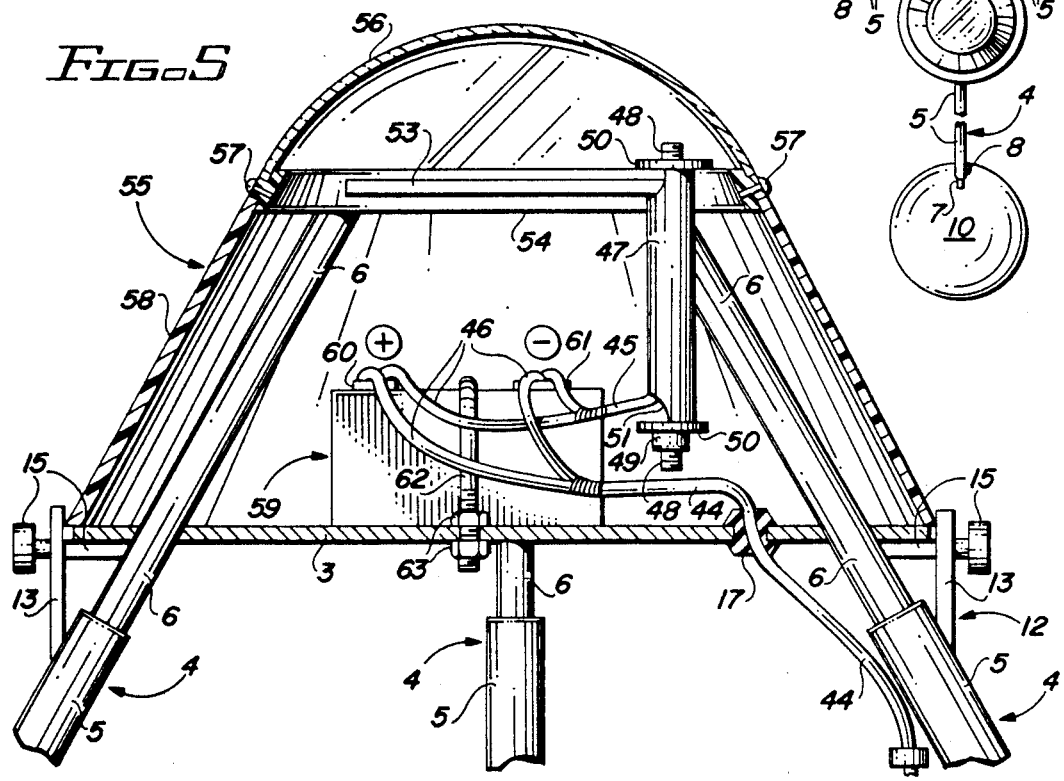

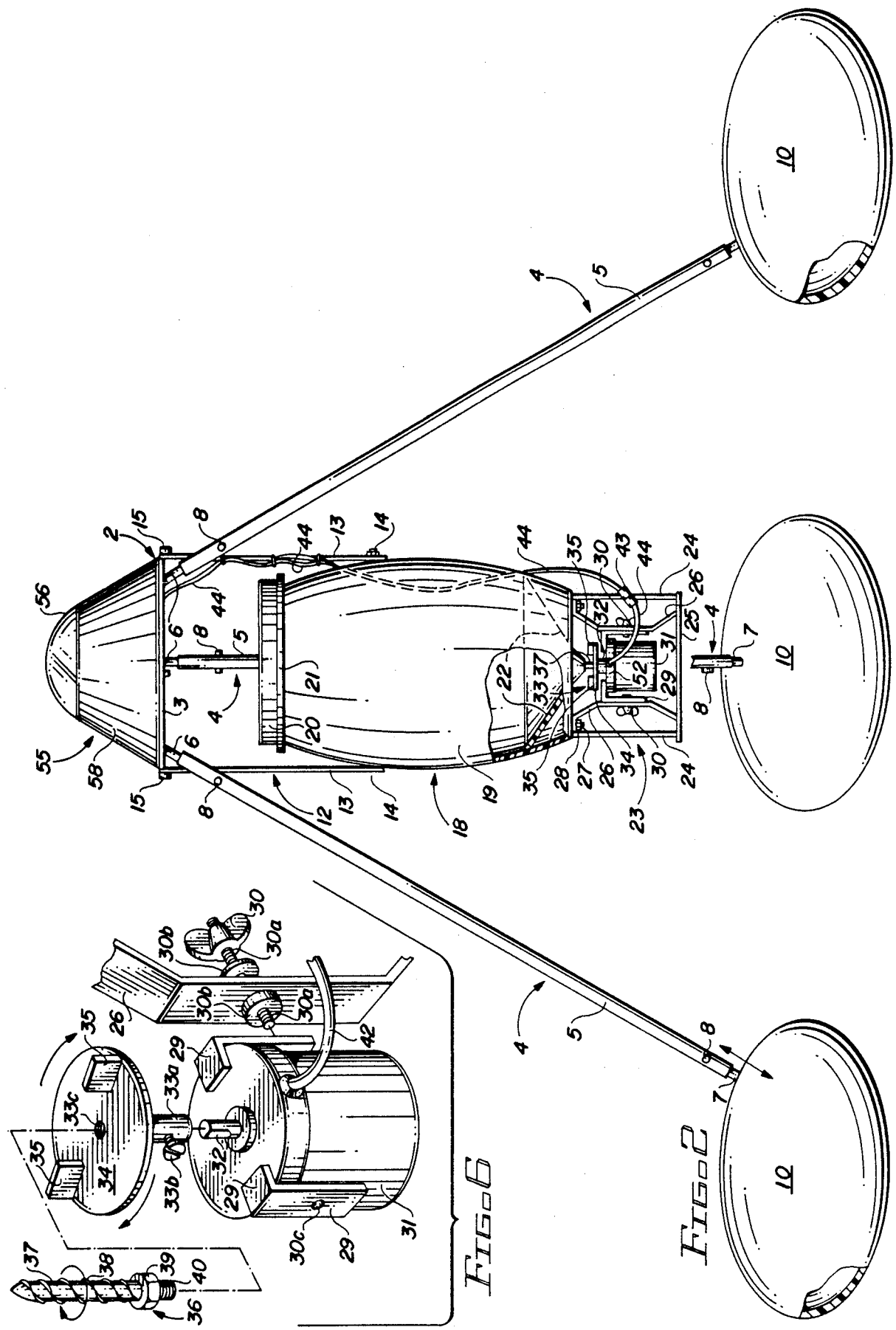

FLOATING FISH FEEDING DEVICE

BACKGROUND OF THE INVENTION

1. Field of the Invention

This invention relates to automatic fish feeding devices and more particularly, to a floating fish feeding device which is self-contained and self-operated by a timing mechanism. In a preferred embodiment, the floating fish feeding device is characterized by multiple legs provided with floats at one end and converging at the opposite end to receive a plate and barrel hanger for suspending a barrel or container which contains fish food. A battery-operated motor is located beneath or in the barrel and the motor shaft is fitted with a spinner plate for receiving feed from the barrel by gravity and distributing the feed in a fan-shaped pattern at predetermined intervals determined by the timing mechanism. A solar dome may be provided on the floating fish feeding device for enlosing a solar panel and charging the battery.

Fish farming, and particularly catfish farming, wherein fish are raised under controlled conditions in small bodies of water such as ponds, is an ever-increasingly important source of food. Currently, such fish are fed periodically, and usually daily, by workers who supply particulate protein feed to the fish by hand or by operation of homemade mechanical fish feeding devices, in an amount determined by a formula according to the average size or age of the fish. It is essential in the raising of fish such as catfish, that the fish be fed regularly, since the fish are concentrated in a much smaller area than they would normally be in a wild habitat. Accordingly, the expense of maintaining reliable personnel to insure regular feeding often accounts for a major portion of the overhead involved in fish farming operations. The problem of overfeeding or underfeeding is always present, since as the fish grow, it is often difficult to estimate or calculate how much feed is necessary at any given point in time, in order to insure optimum growth of the fish. Accordingly, while underfeeding will inhibit the growth and general health of fish, overfeeding of the fish may result in polluting the pond or lake where the fish are grown, thereby contributing to fish kills and also inhibiting fish growth and health.

2. Description of the Prior Art

Various types of apparatus have been developed in the prior art to automatically feed catfish and other varieties of fish grown in small ponds and lakes for commercial purposes. Unfortunately, such devices have, for the most part, proved unsuccessful, particularly on a commercial scale, and the majority of fish growers still employ the expensive hand-feeding method of operation. Automatic fish feeding devices may be broadly divided into two major categories. The first includes continuously operable, electrically-powered mechanisms which deposit feed into a body of water at a predetermined rate. These devices are characterized by a primary disadvantage, in that the feeding habits of fish may vary drastically according to weather conditions, growth rate and other factors. Accordingly, the continuously operating machines may deposit an excess of feed due to these variables, which results in pollution of the water body. Moreover, these devices are also subject to power failure. A second classification of feeding mechanisms is that in which the dispensing of feed is induced by the normal feeding activity of fish, wherein the fish actuate the feeding mechanism by contacting a triggering mechanism located beneath the surface of the water. These "demand-responsive" feeding devices are potentially more efficient than the continuously operated electric feeders, since they are capable of providing fish food on demand, both during active and inactive feeding periods. However, these devices are subject to a disadvantage, in that they require the continuous provision of food at or near the triggering mechanism, in order to attract the fish and induce the triggering response. Accordingly, the machines tend to be rather complex, thereby increasing the possibility of mechanical failure.

U.S. Pat. No. 3,487,433, dated Dec. 30, 1969, to B. M. Fleming, details a "Self-Fish Feeder" which is mounted over a fish-containing body of water and has a particulate feed-containing hopper. A combined feed trough and grid structure is suspended on a rod from a conveyor means which is mounted interiorally of the hopper. As the fish contact the feed trough during normal feeding, a resulting movement of the food trough occurs and this movement, caused by the fish "rooting" around a trough-grid combination, is translated through the rod structure to the conveyor means. The conveyor means and related structure then operate to both break up the particulate fish feed around a discharge opening in the hopper and help move the feed through the opening into the trough-grid combination, thereby recharging the trough with feed. A "Fish Self-Feeder" is detailed in U.S. Pat. No. 3,730,142, dated May 1, 1973, to James W. Kahrs, et al. The fish self-feeder is mounted over a body of water containing fish and has a particulate feed-containing hopper consisting of a tapered receptacle containing a funnel having the spout directed through an opening in the bottom of the container. A pendulum rod hangs vertically from the center of the spout by means of a suspension pin hooked into opposed openings in the spout. A feeder plate is adjustably and vertically positioned on the rod, thereby forming a spaced obstruction for feed particles falling through the spout. The lower end of the pendulum terminates in a submerged bumper head, which, when disturbed by the fish, causes relative motion between the feeder plate and funnel spout, thereby producing a partial discharge of feed into the water. U.S. Pat. No. 3,741,163, dated June 26, 1973, to Dale A. Bush, describes a "Demand-Responsive Fish Feeder". This fish feeder is operable to dispense quantities of particulate feed into a fish-containing body of water in response to normal feeding activities of the fish. The hopper contains a supply of feed above the water surface and an actuating means, disposed externally of the hopper, includes a lower portion extending below the water surface and is operable to release desired quantities of feed in response to movement of the lower portion by fish adjacent to the lower portion. A "Fish Feed Discharging Apparatus" is detailed in U.S. Pat. No. 4,606,300, dated Aug. 19, 1986, to Mikael Sterner. The apparatus is designed to discharge fish feed and includes a feed-proportioning device connected to a probe mechanism which is at least partially immersed in water and is excitable by fish for activating the proportioning device to discharge a quantity of feed to the fish. The probe device contains an element which is sensitive to sound and/or pressure waves, reacts to fish movement and sends signals to an electrical device for activating the portioning device. U.S. Pat. No. 4,699,086, dated Oct. 13, 1987, to Kei Mori, details an "Underwater Fish Feeding Plant". The fish feeding plant utilizes a solar ray collecting device and an algae cultivating device installed in the sea, or in a lake or pond. The plant includes multiple cylinders which are vertically oriented in the water and are connected by horizontal cylinders. A solar ray collecting device is installed on the water surface above the structure and a culture device for cultivating algae or similar marine life is installed in the water. Solar rays collected by the solar ray collecting device are transmitted to the culture device for cultivating the algae through an optical conductor cable. U.S. Pat. No. 4,699,087, dated Oct. 13, 1987, also to Kei Mori, details a "Concentrated Fish Feeding Device". The concentrated fish feeding device utilizes a solar ray collecting device and an algae-cultivating device installed in the sea, or in a lake or pond. The device includes a water-immersed culture device for cultivating algae or the like, a photo-sensitive light source for supplying light rays to the algae culture device and an illuminated light source for entirely illuminating the algae culture device. U.S. Pat. No. 4,703,719, dated Nov. 3, 1987, also to Kei Mori, details a "Fish Feeding Device" which utilizes a solar ray collecting device and an algae cultivating device. The fish feeding device includes multiple cylinders vertically installed in a water body, a solar ray collecting device and/or artificial light sources mounted on the cylinders, cultivation devices suspended from the cylinders for cultivating algae and optical conductors for supplying solar rays and/or artificial light rays to the cultivation devices.

It is an object of this invention to provide a new and improved floating fish feeding device which is self-contained, automatic and capable of feeding fish according to predetermined time sequences.

Another object of the invention is to provide a new and improved floating fish feeding device which is equipped with an optional solar dome containing a solar panel for charging a battery which periodically operates a feed-dispensing mechanism according to a timing device.

Still another object of the invention is to provide a self-contained, floating fish feeding device which is characterized in a preferred embodiment by multiple legs provided with floats at one end and converging at the opposite ends to support an optional solar dome containing a solar panel for charging a battery which is used to power the device. A food-containing barrel is suspended beneath the converging ends of the legs above the plane of the floats. The barrel supports or encloses a feed-dispensing motor and a spinner plate is positioned beneath the barrel and receives feed from the barrel by gravity and periodically dispenses the feed in a fan-shaped pattern responsive to operation of a timing device.

Still another object of the invention is to provide a floating fish feeding device which utilizes a solar dome containing a solar panel that is exposed to the sun throughout the daylight hours, in order to recharge a battery used to operate a feed-dispensing mechanism.

SUMMARY OF THE INVENTION

These and other objects of the invention are provided in a new and improved self-contained, automatically operated, floating fish feeding device which is characterized in a preferred embodiment by multiple fixed or adjustable legs, each having a float at one end, the legs converging at the opposite ends to support a feed-containing barrel or container and an optional solar dome. The feed-containing barrel further includes a pellet dispensing funnel and supports a feed-dispensing apparatus for receiving pelletized food by gravity flow and dispensing the pellets in a fan-shaped pattern by means of an electric motor powered by a battery. The optional solar dome contains a solar panel which is designed to receive light from the sun during daylight hours to recharge the battery and prolong the unattended operating life of the fish feeding device.

BRIEF DESCRIPTION OF THE DRAWING

The invention will be better understood by reference to the accompanying drawings, wherein:

FIG. 1 is a perspective view of a preferred embodiment of the floating fish feeding device of this invention;

FIG. 2 is a side view, partially in section, of the floating fish feeding device illustrated in FIG. 1;

FIG. 3 is a front view of a typical timer used in the floating fish feeding device illustrated in FIGS. 1 and 2;

FIG. 4 is a top view of the floating fish feeding device illustrated in FIGS. 1 and 2;

FIG. 5 is a sectional view of an optional solar dome adapted for mounting on the floating fish feeding device illustrated in FIGS. 1, 2 and 4; and FIG. 6 is an exploded view of a preferred motor and spinner plate combination for dispensing fish food from the floating fish device of this invention.

DESCRIPTION OF THE PREFERRED EMBODIMENTS

Referring initially to FIGS. 1, 2 and 5 of the drawings, the floating fish feeding device of this invention is generally illustrated by reference numeral 1. The floating fish feeding device 1 is characterized by a support frame 2, which includes a frame plate 3, supported by three frame legs 4, each of which includes a top leg member 6, central leg member 5 and a bottom leg member 7. The converging ends of the three top leg members 6 extend above the frame plate 3 and the opposite ends of the top leg members 6 extend in telescoping relationship into the three corresponding central leg members 5, respectively. In a preferred embodiment of the invention, the top leg members 6 extend through openings (not illustrated) provided in the frame plate 3 to a solar panel plate 54, which is located parallel to and above the frame plate 3. In a most preferred embodiment of the invention, both the frame plate 3 and the solar panel plate 54 are round and are welded to the top leg members 6, respectively. A solar panel 53 is seated in the solar panel plate 54 and a solar dome 55 encapsulates the solar panel plate 54 and is seated on the frame plate 3, as further illustrated in FIGS. 1, 2 and 5. The solar dome 55 is further characterized by a transparent dome cap 56 which extends to the solar panel plate 54 and a hood 58, which extends below the transparent dome cap 56 to the frame plate 3. In another preferred embodiment of the invention, the transparent dome cap 56 is constructed of a clear plexiglass material, while the hood 58 is manufactured of a heavy gauge ABS plastic material having an ultra-violet protective coating. A battery 59 is seated on the frame plate 3 inside the hood 58 of the solar dome 55 and includes a positive terminal 60 and a negative terminal 61. A U-shaped battery bracket 62 is fitted over the battery 59, the extended threaded legs of the battery bracket 62 project through openings (not illustrated) provided in the frame plate 3 and a pair of bracket nuts 63 are threaded on each of the battery bracket legs on both sides of the frame plate 3, in order to securely mount the battery 59 on the frame plate 3, as illustrated in FIG. 5.

Just as the top leg members 6 extend telescopically from corresponding tubular central leg members 5 in each of the three frame legs 4, respectively, three bottom leg members 7 also project in telescoping relationship from the bottom extending ends of the corresponding central leg members 5, respectively. The opposite ends of the bottom leg members 7 are welded or otherwise secured to three floats 10, respectively, and adjusting pins 8 extend through openings (not illustrated) provided in the central leg member 5 and through a selected registering one of several spaced openings (not illustrated) provided in the telescoping top leg members 6 and bottom leg members 7, respectively, in order to mount the top leg members 6 and the bottom leg members 7 in adjustable, telescoping relationship in the corresponding central leg members 5. Alternatively, each of the top leg members 6 and the bottom leg members 7 can be welded or bolted to the ends of the larger central leg members 5, respectively, in fixed relationship.

As illustrated in FIG. 2, a barrel hanger 12 extends downwardly from the solar panel plate 54 and is characterized by two or more vertically oriented hanger straps 13, the bottoms of which are attached to a feed-containing barrel 18 by means of corresponding bottom strap bolts 14, and the tops of which hanger straps 13 are secured to the hanger plate 16 by means of top strap bolts 15. In a preferred embodiment of the invention the top strap bolts 15 are threadably inserted in corresponding nuts (not illustrated) which are welded to the hanger plate 16, in order to removably secure the barrel hanger 12 and the container or barrel 18 to the hanger plate 16. The barrel 18 is sufficiently large to contain a desired quantity of particulate fish food, which is commonly characterized as pelletized protein and is loaded into the barrel 18 through the removable barrel top 20. The top flange 21 provided on the barrel top 20 facilitates easy removal and replacement of the barrel top 20. The barrel sides 19 may be curved as illustrated in FIGS. 1 and 2 of the drawings, or the barrel 18 may be characterized by a drum-shaped vessel or container having straight sides, as desired. A funnel 22 is shaped inside the bottom end of the barrel 18 and a feed dispensing bracket 23 is attached to the bottom end of the barrel 18, as further illustrated in FIG. 2. The feed dispensing bracket 23 is characterized by vertical, parallel bracket members 24, which are welded or otherwise attached to the bottom end of the barrel 18 and are connected at the extending ends by a bottom bracket member 25. Internal bracket members 26 are disposed inside the vertical bracket members 24 and one end of each of the internal bracket members 26 is bolted to the bottom of the barrel 18 by means of internal bracket bolts 27 and corresponding internal bracket nuts 28. The opposite ends of the internal bracket members 26 are welded or otherwise attached to the bottom bracket member 25. An L-shaped motor mount bracket 29 is disposed inside each of the vertical bracket members 24 and one leg of each of the motor mount brackets 29 is attached to oppositely-disposed ones of the internal bracket members 26 by means of bracket bolts 30a and wing nuts 30, as further illustrated in FIG. 6. Washers 30b are disposed between the motor mount bracket 29 and the internal bracket members 26, respectively, as well as between the internal bracket members 26 and the wing nuts 30, respectively, and one end of the bracket bolt 30a is threaded into the internally threaded bracket opening 30c. A motor receptacle 31, which houses an electric motor (not illustrated) is attached to the opposite or top leg of the motor mount bracket 29, in order to secure the motor receptacle 31 in vertical relationship as illustrated in FIGS. 2 and 6, wherein the motor shaft 32 projects upwardly from the photocell 52, located on top of the motor receptacle 31, toward the bottom of the barrel 18. As illustrated in FIGS. 2 and 6, a spinner plate 33 is located above the motor receptacle 31 and includes a downwardly-depending plate collar 33a, fitted with a collar bolt 33b, for insertion on the extending end of the motor shaft 32, in order to secure the spinner plate 33 on the motor shaft 32 of the electric motor enclosed in the motor receptacle 31. The plate base 34 of the round spinner plate 33 is provided with upward-standing, spaced plate blades 35, which are designed to receive and distribute food pellets from the funnel 22 of the barrel 18 when the electric motor is operating, as hereinafter further described. An internally threaded base opening 33c is provided in the center of the plate base 34, in order to threadably receive corresponding mount threads 40, provided in the lower end of the agitator shaft 37 of an agitator 36. The agitator shaft 37 further includes agitator threads 38 on the upper portion thereof, for extending into an opening (not illustrated in the funnel 22 and agitating the food pellets therein. A shaft nut 39 is threaded on the agitator shaft 37, in order to facilitate mounting the bottom threaded portion of the agitator shaft 37 to the plate base 34 of the spinner plate 33. Accordingly, it will be appreciated that when the motor receptacle 31 and the spinner plate 33 are mounted on the motor mount bracket 29 beneath the barrel 18 as illustrated in FIG. 2, the agitator shaft 37 extends upwardly into the funnel 22 through the funnel opening (not illustrated) provided in the bottom of the funnel 22, to agitate food pellets located in the barrel 18 when the electric motor is operating. It will be further appreciated by those skilled in the art that the opening provided in the feed dispensing end of the funnel 22 is larger than the diameter of the agitator shaft 37, in order to facilitate a flow of food pellets through the opening, past the agitator shaft 37 and onto the plate base 34, as hereinafter further described. A timer 65 is also provided in the motor receptacle 31 and the timer 65 and photocell 52 are wired into the harness wiring 44, in order to effect operation of the electric motor at designated time intervals, usually after dawn, as desired. Motor wiring 42 is attached to the lower end of the harness wiring 44 by means of a motor wiring connector 43, as illustrated in FIG. 2 and the harness wiring 44 extends alongside the barrel 18 and one of the hanger straps 13 to the frame plate 3, where it projects through a wiring grommet 17 and into the hood 58 of the solar dome 55, as illustrated in FIG. 5. The harness wiring 44 then branches to define battery wiring 46, which is attached to the positive terminal 60 and the negative terminal 61, respectively, of the battery 59 and extends from these terminals to define a length of solar panel wiring 45 which projects through the tube slot 51 of a wiring tube 47, to the solar panel 53. The wiring tube 47 is suspended from the solar panel plate 54 by means of a tube bolt 48, which extends through the tube 47 and receives a pair of tube washers 50 and tube nut 49 on the opposite end thereof.

Referring now to FIGS. 1, 2 and 3 of the drawings, while the timer 65 may be designed in any desired configuration, in a preferred embodiment of the invention, the timer 65 is characterized by a timer plate 66, provided with feed time numerals 67 and feed frequency numerals 69, inscribed thereon. A feed time knob 68 is rotatably mounted to the timer plate 66 centrally of the feed time numerals 67, while a feed frequency knob 70 is similarly rotatably mounted in the timer plate 66 centrally of the feed frequency numerals 69. Accordingly, the feed time in seconds and the successive feeding sequences in hours can be adjusted by manipulating the feed time knob 68 and the feed frequency knob 70, respectively, in order to control the feeding intervals and time in the floating fish feeding device 1, as further hereinafter described.

Referring again to FIGS. 1, 5 and 6 of the drawings, the floating fish feeding device 1 is operated by first adjusting the frequency knob 70 in the timer 65 to the appropriate feed frequency numeral 69, to indicate the length of time of operation of the motor 31 from sunrise, when the electric motor is first activated by the photocell 52. The feed time knob 68 is then adjusted to the appropriate feed time numeral 67, in order to determine how long the electric motor will operate after being activated. Accordingly, the photocell 52 operates to activate the unit each morning at sunrise and the electric motor will run for the length of time which is set by the feed time knob 68 on the timer 65. The frequency of feeding set by the feed frequency knob 70 then determines when the electric motor will again be activated by the timer 65 to operate the spinner plate 33 for the selected period of time. Furthermore, the electric motor will be operated according to this sequence until sundown, at which time the unit will shut down.

It will be appreciated by those skilled in the art that the quantity of feed dispensed from the barrel 18 can be controlled by raising and lowering the motor receptacle 31, the enclosed electric motor and the spinner plate 33. This adjustment is made by loosening the wing nuts 30, sliding the motor mount brackets 29 upwardly or downwardly with respect to the adjacent internal bracket members 26 and then tightening the wing nuts 30. It will be further appreciated that food pellets stored in the barrel 18 fill the funnel 22 and are distributed through the opening (not illustrated) through which the agitator shaft 37 projects, to accumulate on the plate base 34. When the spinner plate 33 is not operating, the food pellets stack upwardly from the plate base 34 in a cone-shaped configuration, until they block the opening in the bottom of the funnel 22 and stop the flow of pellets from the barrel 18. However, when the electric motor is activated and the spinner plate 33 begins to rotate as illustrated in FIG. 6, the food pellets which have accumulated on the plate base 34 are thrown outwardly by centrifugal force into the water and a stream of pellets continues to flow through the opening in the bottom of the funnel 22 and strike the plate base 34 and the upward-standing plate blades 35, where they are also thrown outwardly into the water. This process continues as long as the electric motor is operating according to the adjustment of the feed time knob 68 in the timer 65. However, when the electric motor stops operating responsive to operation of the timer 65, pellets again accumulate on the stilled plate base 34 and build in a cone to the funnel opening to prevent further accumulation.

Referring now to FIG. 5 of the drawing, since the transparent dome cap 56 is curved in the shape of an inverted bowl, sunlight is allowed to focus on the solar panel 53 during the daylight hours to supply a flow of electric current through the solar panel wiring 45, which is attached to the solar panel 53, and through the battery wiring 46 to the battery 59. This electrical charge is applied to the positive terminal 60 and negative terminal 61 of the battery 59 to maintain the battery 59 in a charged condition. Operation of the electric motor is effected by electric current supplied by the battery 59 and distributed to the electric motor through the battery wiring 46, harness wiring 44 and motor wiring 42, as illustrated in FIGS. 2 and 5.

In operation, and referring again to FIGS. 1, 2, 3 and 6 of the drawings, the barrel 18 is first filled with protein pellets by removing the barrel top 20. Operation of the electric motor and the spinner plate 33 can then be checked by moving the feed time knob 68 to the "test" position, to momentarily activate the electric motor. The feed time knob 68 is then adjusted to the desired feeding time span for each feeding frequency provided by adjustment of the corresponding feed frequency knob 70, as heretofore described. The floating fish feeding device 1 is then ready for operation on an automatic, timed feeding program which is determined by the feed time and feed frequency settings in the timer 65, which program is automatically initiated at dawn by the photocell 52.

It will be appreciated by those skilled in the art that the solar dome 55 is an optional feature for the floating fish feeding device 1, since the floating fish feeding device 1 can be operated by a 12-volt battery or powered by individual C or D-cell batteries, as desired, without using the recharging feature offered by the solar panel 53. However, under circumstances where it is desired to use the solar dome 55, the solar panel 53 serves to recharge a conventional 12-volt battery 59 positioned on the frame plate 3, as illustrated in FIG. 5. The transparent dome cap 56 is constructed of durable, shock-resistant plexiglass or an equivalent material, in order to facilitate maximum light transmission for optimum operation of the solar panel 53. The transparent dome cap 56 is easily attached to the solar panel plate 54 by means of dome bolts 57, as illustrated in FIG. 5. In a most preferred embodiment of the invention, the hood 58 is constructed of opaque ABS plastic material, in order to prevent the transmission of light and thereby prolong the life of the battery 59, the solar panel wiring 45, battery wiring 46 and the harness wiring 44 located inside the solar dome 55, as further illustrated in FIG. 5. Since the transparent dome cap 56 is seated on top of the hood 58 and the bottom edge of the hood 58 is secured on the frame plate 3 by means of the upwardly projecting ends of the hanger straps 13, the hood 58 is also secured in position on the frame plate 3.

It will be further appreciated that while three frame legs 4 are illustrated in the drawings for supporting the barrel 18 and the optional solar dome 55, additional frame legs can be added as deemed necessary, with an additional float 10 provided for each leg. Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A floating fish feeding device for dispensing particulate feed to fish, comprising a plurality of elongated legs converging at one end and diverging at the opposite end, a frame plate carried by said one end of said legs and hangar means carried by said frame plate; a float carried by each of said legs at the opposite end thereof; a container carried by said hanger means for containing a supply of said particulate feed and a feed-dispensing opening provided in the bottom of said container for dispensing the particulate feed from said container; feed-dispensing means disposed beneath said container and said feed-dispensing opening for receiving the particulate fish feed from said container and dispensing said particulate fish feed to the fish; and timer means electrically connected to said feed-dispensing means for controlling the operation of said feed-dispensing means.

2. The floating fish feeding device of claim 1 wherein said timer means further comprises a first timing circuit for determining at least one selected sequence of operation of said feed-dispensing means and a second timing circuit for determining the time of operation of said feed-dispensing means in said at least one sequence of operation.

3. The floating fish feeding device of claim 1 further comprising solar dome means carried by said one end of said legs, at least one battery located in said solar dome means, said battery electrically connected to said feed-dispensing means and at least one solar panel provided in said solar dome means, said solar panel electrically connected to said battery for recharging said battery.

4. The floating fish feeding device of claim 3 wherein said timer means further comprises a first timing circuit for determining at least one selected sequence of operation of said feed-dispensing means and a second timing circuit for determining the time of operation of said feed-dispensing means in said at least one sequence of operation.

5. The floating fish feeding device of claim 1 further comprising feed bracket means carried by said container for supporting said feed-dispensing means beneath said container, a funnel shaped in said container, and wherein said feed-dispensing opening is provided in communication with said funnel and in alignment with said feed-dispensing means, whereby the feed is dispensed through said funnel and said feed-dispensing opening from said container to said feed-dispensing means by operation of gravity.

6. The floating fish feeding device of claim 1 wherein said feed-dispensing means further comprises at least one battery, an electric motor electrically connected to said battery and a spinner plate carried by the shaft of said electric motor in rotatable relationship, said spinner plate positioned beneath said feed-dispensing opening in said container for receiving the feed in stacked relationship when said electric motor is not energized and dispensing the feed by contrifugal force when said electric motor is energized by said battery.

7. A floating fish feeding device for dispensing particulate feed to fish comprising at least three elongated legs converging at one end and diverging at the opposite end; a float provided on said opposite end of each of said legs; a container carried by said legs for containing a supply of the feed, a funnel provided in said container and a feed-dispensing opening provided in the bottom of said container, said feed-dispensing opening communicating with said funnel for dispensing the feed from said container; feed-dispensing means disposed beneath said container and said feed-dispensing opening for receiving the particulate fish feed from said container and dispensing said particulate fish feed to the fish; timer means electrically connected to said feed-dispensing means for controlling the operation of said feed-dispensing means; and a solar dome carried by said one end of said legs, a transparent dome cap provided in the top of said solar dome, an opaque hood provided in said solar dome beneath said dome cap, at least one battery located in said solar dome, said battery electrically connected to said feed-dispensing means and at least one solar panel provided in said solar dome, said solar panel electrically connected to said battery for recharging the battery.

8. The floating fish feeding device in claim 7 further comprising a frame plate defining the bottom of said solar dome, said frame plate carried by said one end of said legs and hanger means carried by said frame plate and wherein said container is attached to said hanger means.

9. The floating fish feeding device of claim 8 wherein said feed-dispensing means further comprises an electric motor electrically connected to said battery and a spinner plate carried by the shaft of said electric motor in rotatable relationship, said spinner plate positioned beneath said feed-dispensing opening in said container for receiving the feed in stacked relationship when said electric motor is not energized and dispensing the feed by contrifugal force when said electric motor is energized by said battery.

10. The floating fish feeding device of claim 9 wherein said timer means further comprises a first timing circuit for determining at least one selected sequence of operation of said electric motor and said spinner plate and a second timing circuit for determining the time of operation of said electric motor and said spinner plate in said at least one sequence of operation.

11. The floating fish feeding device of claim 10 further comprising agitator means carried by said spinner plate, said agitator means projecting through said feed-dispensing opening for agitating the particulate feed.

* * * * *